Jan. 27, 1959  K. SANDVOLD  2,871,278
ARRANGEMENT FOR ELECTRIC SMELTING FURNACES
Filed Oct. 8, 1956  2 Sheets-Sheet 1

INVENTOR
Knut Sandvold
BY
Eyre, Mann & Burrows
ATTORNEYS

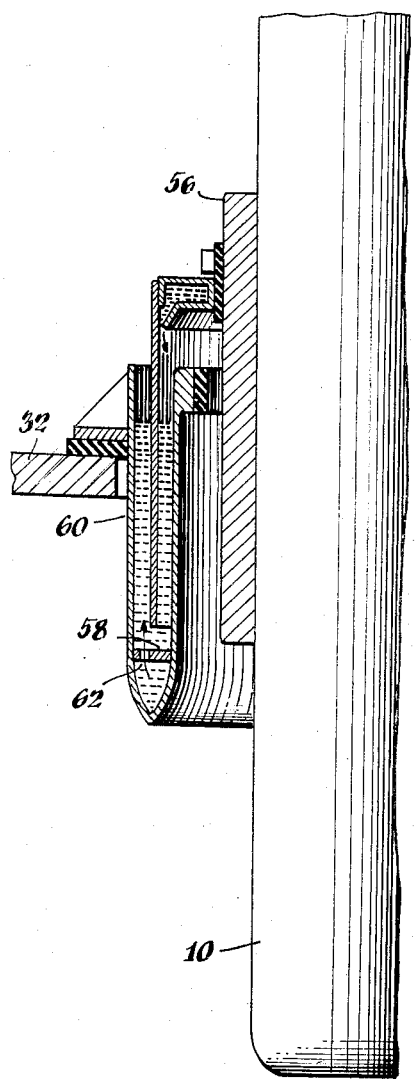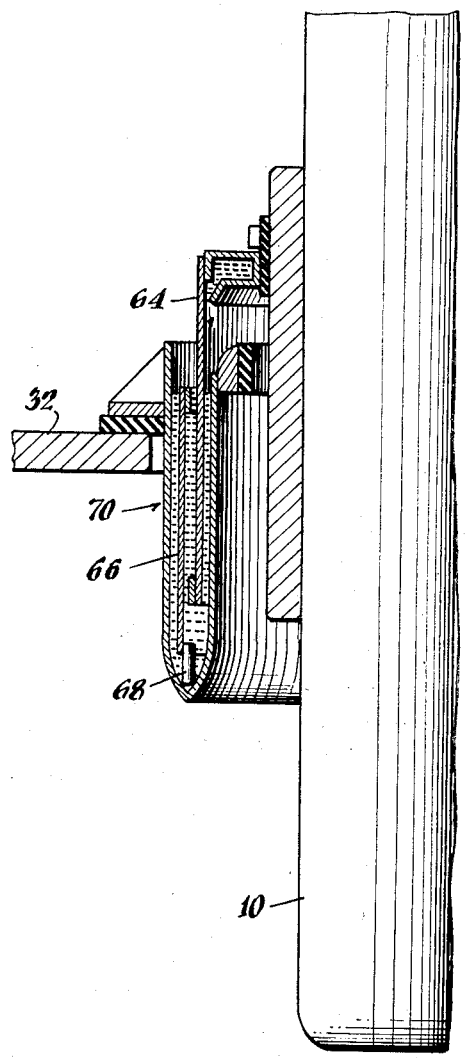

United States Patent Office 2,871,278
Patented Jan. 27, 1959

2,871,278

ARRANGEMENT FOR ELECTRIC SMELTING FURNACES

Knut Sandvold, Oslo, Norway, assignor to Elektrokemisk A-S, Oslo, Norway, a corporation of Norway Application October 8, 1956, Serial No. 614,436

Claims priority, application Norway October 12, 1955

5 Claims. (Cl. 13—17)

In modern electric furnaces of the type used for smelting and the like, there is an increasing tendency to have the furnaces enclosed. The electrodes extend down through the roof of the furnace and as there has to be movement of the electrodes relative to such roof, sealing the connection between the electrodes and the roof has offered a considerable problem.

The movements of such an electrode relative to the roof are of two types. From time to time the electrode has to be moved in its holder as it is consumed. This, however, occurs only infrequently, and in each case the electrode is moved downwardly relative to its holder and this movement does not offer the major problem. On the other hand, the electrodes are moving up and down with great frequency (usually under automatic control) in order that the resistance of the furnace may be adjusted in such a way that a substantially constant flow of electrical energy through the furnace will take place. These movements, as stated, take place almost continuously and are both up and down.

Previously, it has been suggested that a seal can be had between the electrode and the fixed roof by the use of a water seal. The water seal ordinarily comprises an annular trough of substantial depth for containing the water, which trough is connected to the roof, while the movable electrode carries a cooperating bell-shaped member comprising a fin-like portion that surrounds and is spaced from the electrode and a top portion that preferably forms a seal with the electrode. The fin member extends down into the water in the trough to form the movable seal. Such a seal may be very efficient under some circumstances but it has been found that water seals immediately around the electrodes are not entirely satisfactory because the heat around the electrode is so great that the water may be boiled away from the trough on the inside of the fin member.

According to the present invention, I overcome this problem by supplying means for flowing water against the inside of the fin above the trough but below the top portion of the bell that is connected to the electrode. The water may be supplied on the inside of the fin by sprays or the like but preferably a conduit is formed adjacent the top of the bell into which water may be introduced continuously, and a small annular space or series of apertures permit the water to flow out of the conduit against the inner face of the fin member. The water flows down into the trough on the inside of the fin member, then around the bottom of the fin member and any excess water can be withdrawn from the outside of the trough near its top. This flow of water effectively cools the fin member and supplies flowing water to the inside portions of the trough so that adequate water is at all times present in the trough to maintain the necessary seal.

My invention may be readily understood by reference to the accompanying drawings in which—

Fig. 3 is a sectional view which shows still a different form in which the electrode holder itself projects down through the roof of the furnace; and Fig. 4 is a sectional view showing a further modification in which the fin member is made in two telescoping sections so as to permit increased movement of the electrode.

Figure 1:
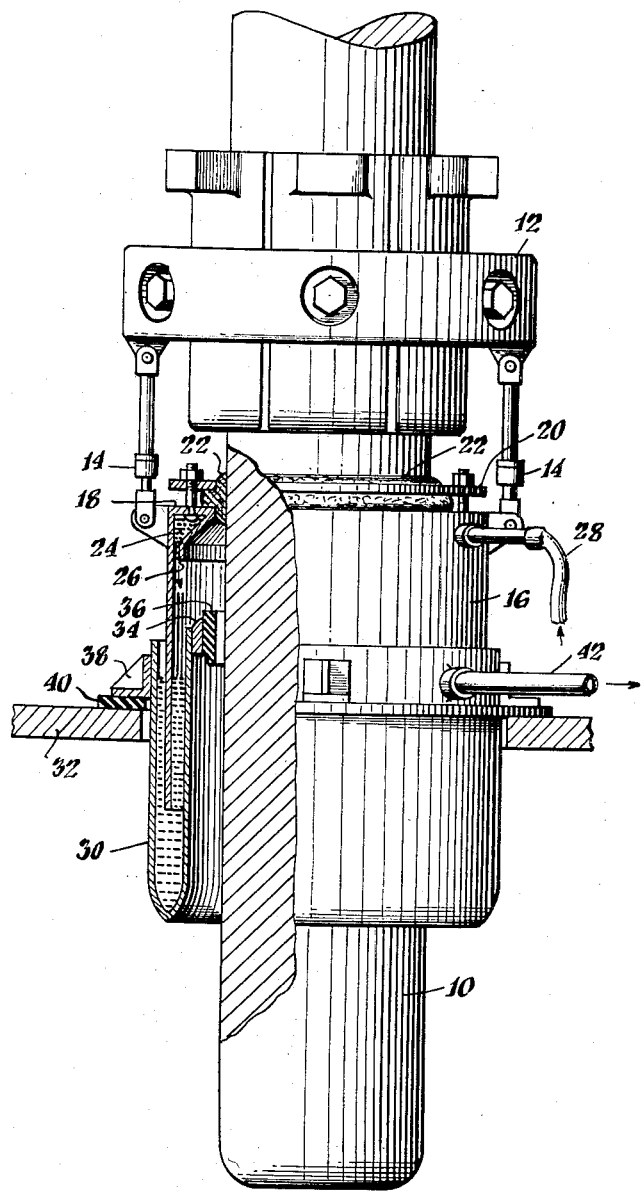
Fig. 1 is a sectional view through a portion of the roof of a furnace with one-half of the electrode and sealing mechanisms shown in section.

Referring to Fig. 1, 10 is the usual carbon electrode which may be either a prebaked electrode or may be a so-called Soederberg electrode of the continuous type. 12 is the electrode holder which clamps around the electrode and is of a type commonly employed in the art. This is suspended by usual mechanism not here shown.

Hanging from the clamp 12 by supports 14 is the fin member 16. This member has a top portion 18 extending in toward the electrode 10 and may be supplied with a packing ring 20 to hold packing 22 which will seal the fin member against the electrode.

Within the fin member 16 and below the top portion 18 is formed an annular conduit 24 which is here shown as having an aperture 26 at its bottom immediately adjacent the inner face of the fin member 16. Water is supplied to the conduit 24 through the flexible pipe 28 and such water will fill the conduit 24 and flow through the aperture 26 on the inside face of the fin 16.

The fin 16 extends down into an annular trough member 30 carried by the furnace roof 32. This trough member is here shown as having an inner reinforcing ring 34 lined with electrical insulation 36. It will be noted that there is an appreciable clearance between the insulation 36 and the electrode 10 so that the electrode will be free to move relative to the fixed portions of the structure. The trough member 30 is shown as connected with roof 32 through the brackets 38 which are also insulated from the roof by insulation 40.

Water from the conduit 24 will flow down on the inside of fin member 16, filling trough 30, with the water on the inside of the fin being kept in continuous movement by the flow. This water will pass under the bottom of fin 16 and excess water will be withdrawn from the trough 30 through the overflow pipe 42.

By the arrangement here shown, the inside of the fin member will be kept properly cooled and at the same time the inner part of the trough 30 will be kept full of water to maintain the seal, as the flow of water is from the inside of the fin toward the outside portion and the trough cannot overflow unless the inside portion of the trough is full of water.

Figure 2:
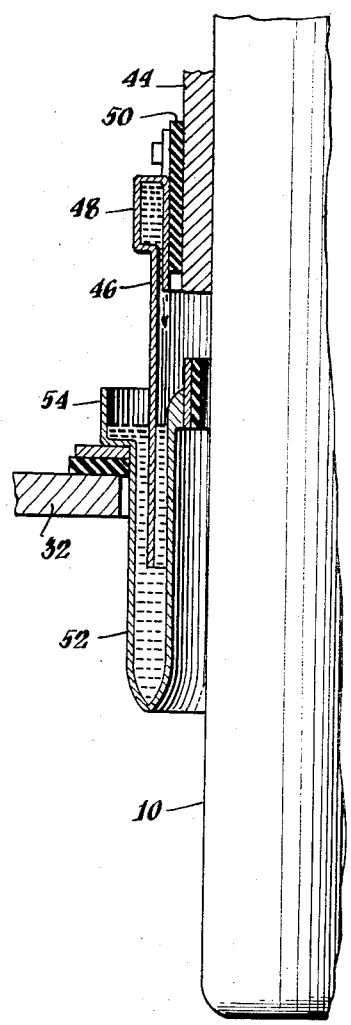
Fig. 2 is a sectional view showing a modified form of construction.

In Fig. 2 the electrode clamp indicated at 44 is intended to be of the continuous circular type. Electrode holders of this type are shown, for example, in United States Patents Nos. 2,671,816 and 2,673,227. Here the fin member 46 is provided with a conduit 48 and insulation 50 is provided between the fin member and the electrode holder 44. It is understood that the conduit 48 will have a water inlet corresponding to pipe 28 of Fig. 1. In this figure the trough 52 is shown as provided with an enlarged annular top portion 54. The water outlet corresponding to pipe 42 of Fig. 1 should lead from the upper portion of this enlarged annular member. This makes it possible to have a reserve of water so that if a momentary suction occurs on the inside due to a variation in pressure in the furnace, the seal will not be broken.

In Fig. 3 the electrode holder 56, which is of the same type as the electrode holder of Fig. 2, is shown as extending down through the roof of the furnace. The remaining construction is similar to that shown in Fig. 1 except that in this case a false bottom 58 is shown in the trough 60. Apertures as indicated at 62 permit the water to enter the bottom of the trough but if momentary suction should empty the trough, the water will remain in this bottom portion to prevent the temperature from rising so high as to endanger the structure.

In Fig. 4 the structure is the same as in Fig. 3 except that there the fin member 64 is shown as making a telescopic joint with a bottom extension member 66. The bottom extension member 66 is provided with a series of projections 68 so that the bottom edge of the extension member 66 will be held above the bottom of the trough member 70. This extension will subdivide the trough but the flow of water will not be interfered with. As before, it is understood that inlet and outlet pipes are supplied as shown in Fig. 1.

It is understood that the examples given are intended only to illustrate the manner in which my invention may be carried out and the details thereof are not intended to constitute limitations on the invention. Of course if desired a liquid other than water may be used.

What I claim is:

1. A liquid seal for an electrode of a closed electric furnace having a roof and a movable electrode passing through the roof, comprising a trough member carried by the furnace roof and surrounding the electrode, a bell-shaped member carried by the electrode with an annular, downwardly extending fin adapted to enter said trough and a top portion extending towards the electrode, annular means in the top of the bell shaped member extending around the electrode adapted to receive a flowing stream of water and openings extending out of said annular means for causing water to flow in a substantially continuous film against the inside of said fin above the trough but below the top portion of said bell-shaped member so that the liquid will flow down on the inside of the fin, then enter the inside portion of the trough, pass under the edge of the fin and move up through the outer portion of the trough, and means for withdrawing excess water from the outside upper portion of the trough.

2. A structure as specified in claim 1 in which the said means in the upper part of the bell-shaped member comprises an annular conduit having an opening to permit the water to flow out against the inner face of the fin.

3. A structure as specified in claim 1 in which the upper part of the trough is enlarged to form a reservoir for water to maintain water in the trough in the event of pressure variations.

4. A structure as specified in claim 1 in which the trough has a false bottom to hold water for maintaining the trough water-cooled.

5. A structure as specified in claim 1 in which the trough has a reinforcement on the inside toward the electrode, which reinforcement carries electrical insulation to prevent short-circuiting between the trough and the electrode.

References Cited in the file of this patent

UNITED STATES PATENTS

| Re. 13,027 | Higgins | Oct. 26, 1909 |
| 775,654 | Higgins | Nov. 22, 1904 |
| 914,489 | Hall | Mar. 9, 1909 |
| 2,243,096 | Hardin | May 27, 1941 |
| 2,671,816 | Foyn | Mar. 9, 1954 |
| 2,673,227 | Hubert | Mar. 23, 1954 |

FOREIGN PATENTS

| 519,437 | Belgium | Apr. 15, 1955 |